United States Patent
Fang et al.

(10) Patent No.: US 12,469,035 B2
(45) Date of Patent: *Nov. 11, 2025

(54) SYSTEMS AND METHODS FOR CLASSIFYING ACCOUNTS BASED ON SHARED ATTRIBUTES WITH KNOWN FRAUDULENT ACCOUNTS

(71) Applicant: PAYPAL, INC., San Jose, CA (US)

(72) Inventors: Chuanyun Fang, Shanghai (CN); Chunmao Ran, Shanghai (CN); Itzik Levi, Tel-Aviv (IL); Kun Fu, Shanghai (CN); Adam Cohen, Acre (IL); Avishay Meron, Holon (IL); Doron Hai-Reuven, Kfar-Saba (IL); Amnon Jislin, Timrat (IL)

(73) Assignee: PAYPAL, INC., San Jose, CA (US)

( * ) Notice: Subject to any disclaimer, the term of this patent is extended or adjusted under 35 U.S.C. 154(b) by 1025 days.

This patent is subject to a terminal disclaimer.

(21) Appl. No.: 17/533,054

(22) Filed: Nov. 22, 2021

(65) Prior Publication Data
US 2022/0084037 A1    Mar. 17, 2022

Related U.S. Application Data

(63) Continuation of application No. 16/114,110, filed on Aug. 27, 2018, now Pat. No. 11,182,795.

(51) Int. Cl.
*G06Q 20/40* (2012.01)
*H04L 67/306* (2022.01)

(52) U.S. Cl.
CPC ..... *G06Q 20/4016* (2013.01); *G06Q 20/4014* (2013.01); *H04L 67/306* (2013.01)

(58) Field of Classification Search
CPC .................................................. G06Q 20/4016
See application file for complete search history.

(56) References Cited

U.S. PATENT DOCUMENTS

| | | |
|---|---|---|
| 2007/0106580 A1 | 5/2007 | Yang et al. |
| 2011/0225076 A1* | 9/2011 | Wang ................. G06Q 20/4016 705/35 |

(Continued)

FOREIGN PATENT DOCUMENTS

WO     2007028048 A2    3/2007

OTHER PUBLICATIONS

International Appl. No. PCT/US2019/048402, International Preliminary Report on Patentability mailed Mar. 11, 2021, 6 pages.

(Continued)

*Primary Examiner* — Jay Huang
(74) *Attorney, Agent, or Firm* — Haynes and Boone, LLP

(57) ABSTRACT

Methods and systems are presented for classifying a particular user account as a fraudulent user account by analyzing links between the user account and two or more known fraudulent user accounts collectively. Attributes of the particular user account are compared against attributes of a plurality of known fraudulent accounts to determine that the particular user account has shared attributes with a first known fraudulent account and a second known fraudulent account. The shared attributes with the first known fraudulent account and the second known fraudulent account are analyzed collectively to determine a risk level for the particular user account. The risk level may indicate a likelihood that the particular user account corresponds to a fraudulent account.

20 Claims, 7 Drawing Sheets

(56) References Cited

U.S. PATENT DOCUMENTS

| | | | | |
|---|---|---|---|---|
| 2014/0278733 | A1* | 9/2014 | Sabharwal | G06Q 10/0635 |
| | | | | 705/7.28 |
| 2015/0229666 | A1* | 8/2015 | Foster | H04L 65/403 |
| | | | | 726/22 |
| 2016/0196615 | A1* | 7/2016 | Yen | G06Q 20/4016 |
| | | | | 705/30 |
| 2018/0181937 | A1* | 6/2018 | Wilson | G06Q 20/202 |
| 2019/0236608 | A1* | 8/2019 | Formsma | G06N 7/01 |

OTHER PUBLICATIONS

International Appl. No. PCT/US2019/048402, International Search Report and Written Opinion mailed Nov. 21, 2019, 7 pages.

* cited by examiner

SYSTEMS AND METHODS FOR CLASSIFYING ACCOUNTS BASED ON SHARED ATTRIBUTES WITH KNOWN FRAUDULENT ACCOUNTS

CROSS REFERENCE TO RELATED APPLICATIONS

This application is a continuation of U.S. application Ser. No. 16/114,110, filed Aug. 27, 2018, the disclosure of which is incorporated herein by reference in its entirety.

BACKGROUND

The present specification generally relates to detection of fraudulent user accounts, and more specifically, to classifying a user account as a fraudulent user account based on shared attributes between the user account and known fraudulent accounts.

RELATED ART

Existing electronic services provided today enable electronic transactions, such as e-commerce, electronic fund transfers, etc., to be performed conveniently and efficiently. A user may create a user account with a service provider and may then perform electronic transactions with other user accounts via a computing device. Unfortunately, while the electronic services provide much benefit to many users, they also enable malicious users to perform fraudulent activities via the Internet. For example, a malicious user may also create a user account (e.g., a fraudulent user account) and may then conduct fraudulent activities through the fraudulent user account, which may lead to monetary losses to the service provider and/or other users of the electronic services.

Although once the fraudulent activities performed through the fraudulent user account are detected, the service provider may attempt to prevent further losses by limiting the access of the fraudulent user account (e.g., by deactivating the fraudulent user account), due to the anonymous nature of the Internet, the malicious user may simply create another fraudulent user account and may continue to conduct fraudulent activities using the newly created account. Thus, the service provider may continue to incur additional losses from activities by the same malicious user (e.g., through different user accounts) unless the service provider can detect that the account is associated with a malicious user before any fraudulent activities are conducted. Thus, there is a need for effectively and accurately detecting fraudulent user accounts before fraudulent activities are conducted through the fraudulent user accounts.

Figure 1:
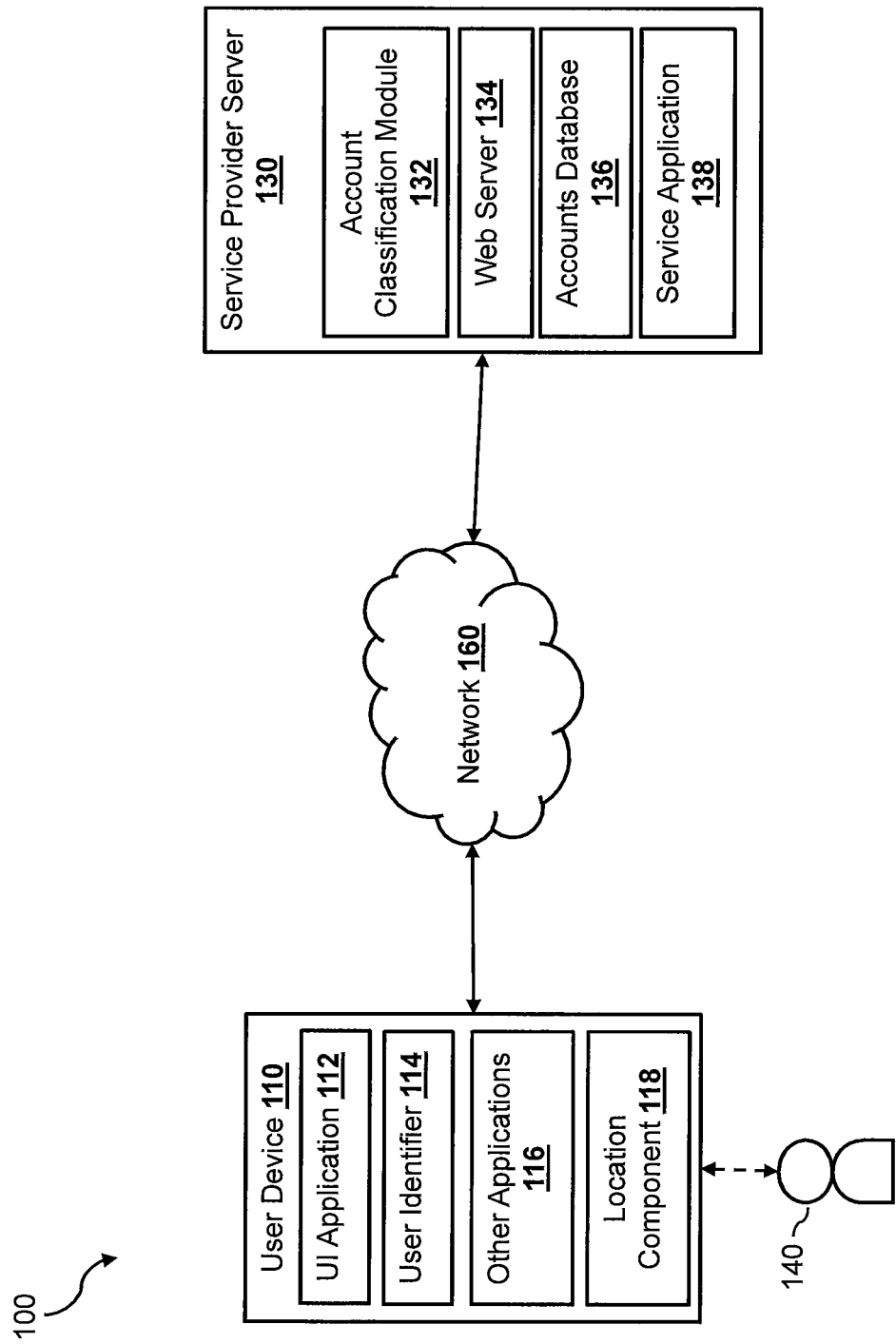
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for classifying a user account (e.g., a seller account) as a fraudulent user account by analyzing shared attributes or data (also referred to herein as links) between the user account and two or more known fraudulent user accounts collectively. As discussed above, service providers, such as PayPal®, Inc., of San Jose, California, USA, may allow users to create user accounts to access electronic services offered by the service providers. In some embodiments, the user accounts are seller accounts that allow users of the accounts to conduct sales of goods and/or services and to receive payments from the sales. The user accounts that have been created with the service provider over time are collectively referred to as the account population of the service provider.

After the user accounts have been created with the service provider, for example through a registration process, the users associated with the user accounts may then perform various electronic activities through their corresponding user accounts. The service provider may determine or identify one or more user accounts as fraudulent user accounts by monitoring account activities associated with the user accounts. For example, the service provider may determine that a user account is a fraudulent user account by discovering one or more losses incurred from fraudulent activities performed through the user accounts. In another example, the service provider may determine that a user account is a fraudulent user account by determining that the account activities of the user account correspond to a predetermined fraudulent activity pattern.

When the service provider determines that a user account (e.g., a first user account) is a fraudulent account, the service provider may attempt to limit further losses by limiting access of the first user account (e.g., by deactivating the first user account). However, as mentioned above, even though the first user account is deactivated, the malicious user who created the first user account may create another account (e.g., a second user account) with the service provider, and may then continue to perform the fraudulent account activities through the second user account until it is again detected by the service provider. For this reason, classifying a user account as a fraudulent account by monitoring activities of the user account can be ineffective in deterring malicious users from using the services offered by the service provider to perform fraudulent activities and in preventing losses.

As such, according to various embodiments of the disclosure, an account classification system may classify a user account as a fraudulent user account based on analyzing links established with known fraudulent user accounts collectively. This way, a new user account created by the malicious user who is associated with one or more known fraudulent accounts may be automatically detected even before the new user account is ever used to perform fraudulent activities.

As discussed above, known fraudulent accounts may be identified from an account population by, for example, monitoring account activities of the user accounts or any other methods. Once the known fraudulent accounts are identified, various attributes of the known fraudulent accounts may be obtained and stored, such as in a database. Example attribute types that are obtained for a known fraudulent account may include at least one of a device identifier (e.g., a media access control (MAC) address, a serial number of a device, etc.) of a device used to access the known fraudulent account, a browser type used to access the known fraudulent account, an Internet Protocol (IP) address associated with the device used to access the known fraudulent account, a physical address, a phone number, an identifier of a funding source (e.g., a hash value representing a bank account number, a hash value representing a credit card account number, etc.), a name, an e-mail address, an item description of an item posted for sale through the known fraudulent account, an account number of an account to an affiliated service provider (e.g., an online marketplace website, etc.), a transaction history, and/or other information of the known fraudulent account.

When user accounts (e.g., new seller accounts) are created through the service provider, the service provider may evaluate each particular user account by comparing the attributes of the particular user account to the attributes of the known fraudulent accounts to determine a risk level for the particular user account. The risk level may indicate a likelihood that the particular user account corresponds to a fraudulent account. In some instances, the malicious user who creates multiple accounts may be clever enough to use different information for the multiple accounts. For example, the malicious user may vary one or more of the attributes when creating the new account. In another example, the malicious user may have a set of attributes of the same attribute type (e.g., a set of credit card numbers, a set of phone numbers, a set of physical addresses, etc.). The malicious user may rotate the set of attributes in those multiple user accounts.

As such, in some embodiments, instead of comparing the attributes of a particular user account against attributes of each known fraudulent user accounts independently, the account classification system may analyze the attributes of the particular user account against attributes of multiple known fraudulent user accounts (e.g., all (or a portion) of the fraudulent user accounts identified by the service provider) collectively. By analyzing the attributes of the particular user account against the attributes of multiple known fraudulent user accounts collectively, the account classification system may determine that the particular user account is linked to two or more known fraudulent user accounts. For example, the account classification system may determine that the particular user account is linked to a first known fraudulent user account based on having a first set of shared attributes (e.g., a shared credit card number, a shared phone number, a shared name, etc.) with the first known fraudulent account. In addition, the account classification system may also determine that the particular user account is linked to a second known fraudulent user account based on having a second set of shared attributes (e.g., a shared credit card number, a shared bank account number, a shared device identifier, etc.) with the second known fraudulent user account. The account classification may then determine the risk level for the particular account by evaluating the links (shared attributes) with the two or more known fraudulent accounts (e.g., the first known fraudulent account and the second known fraudulent account) collectively. This way, the account classification system may determine that the particular user account corresponds to a fraudulent user account even when the particular user account does not share sufficient attributes with a single known fraudulent user account. In other words, the account classification system may determine that the particular user account corresponds to a fraudulent user account even when the particular user account may not be determined as a fraudulent user account using other classification methods that are based on comparing the particular user account against each known fraudulent account independently.

As defined for this disclosure, sharing an attribute between the particular user account and a known fraudulent user account means the two attributes correspond to each other based on a similarity threshold (e.g., a first similarity threshold). The attributes do not have to be identical to be considered shared between the accounts. Furthermore, the first similarity threshold may be defined differently for different attribute types. For example, for the device identifier attribute type, the phone number attribute type, or the name attribute type, the first similarity threshold may be defined based on a specific percentage of identical letters or numerals in the attributes. In another example, the first similarity threshold for the address attribute type may be defined by a geographical distance between the two addresses (e.g., same city, same zip code, same street, etc.). In yet another example, the first similarity threshold for the IP address may be defined by having identical sub-addresses in one or more classes (e.g., Class A, Class B, Class C, Class D, etc.) of the IP addresses. For the item description attribute type, the first similarity threshold may be defined by the type of items being sold and/or defined by a logic that determines how similar the linguistic expressions are in describing items being sold. For the number of transactions attribute type, the first similarity threshold may be defined by a threshold number of transactions between the particular user account and a known fraudulent user account. For the shared group of buyers attribute type, the first similarity threshold may be defined by the number of common buyers who have purchased from both the particular user account and the known fraudulent user account. Thus, based on the attribute, a higher or lower threshold may be applied to determine a match or a link. For example, funding or bank accounts or device identifiers may need to be matched exactly, while a user name, type of good sold, and location of account may not need exact matches, but instead allow some variation and still be identified as having the linked attribute.

In some embodiments, the account classification system may generate a graph to represent the links (shared attributes) between the particular user account and each of the linked known fraudulent user accounts. The graph may include a link between the particular user account and a known fraudulent user account for each shared attribute between the particular user account and the known fraudulent user account. Using the example given above, the graph may include three links between the particular user account and the first known fraudulent user account—one for the shared credit card number, one for the shared phone number, and one for the shared name. Similarly, the graph may include three links between the particular user account and the second known fraudulent user account—one for the shared credit card number, one for the shared bank account number, and one for the shared device identifier.

The account classification system may then derive different values from information obtained from the graph to determine the risk level for the particular user account. For example, the account classification system may derive a value corresponding to the number of known fraudulent user accounts that are linked to the particular user account, a value corresponding to the total number of links generated for the particular user account (the number of shared attributes with the linked known fraudulent user accounts), and other values. In some embodiments, the account classification system may also assign different weights to different attribute types such that different links associated with different attribute types may have different effect in computing the derived values.

Furthermore, the account classification system may also assign different weights to different known fraudulent user accounts such that different links to different known fraudulent user accounts may have different effects in computing the derived values. In some embodiments, the account classification system may determine the weights assigned to the different known fraudulent user accounts based on the monetary loss amounts incurred by activities through the corresponding known fraudulent user accounts. Using the example discussed above, the account classification system may determine that a loss of $200 has been incurred from activities through the first known fraudulent user account and a loss of $300 has been incurred from the activities through the second known fraudulent user account. As a result, the account classification system may assign a first weight to the first known fraudulent user account that is lower than a second weight that is assigned to the second known fraudulent user account. In some embodiments, the first and second weights are proportional to the losses incurred by the first and second known fraudulent user accounts. For example, the weights assigned to the known fraudulent user accounts may be the same as the losses incurred by activities through the known fraudulent user accounts.

In addition to assigning different weights (which represent an amount of influence to the risk level of the particular user account) to different known fraudulent user accounts linked to the particular user account, the account classification system may determine the influence of each shared attribute type in determining the risk level. For example, an attribute type that the particular user account shares with multiple known fraudulent user accounts (through multiple links associated with the attribute type with the known fraudulent user accounts) should have a greater impact in determining that the particular user account corresponds to a fraudulent account than an attribute type that the particular user account shares with only one known fraudulent user account. As such, in some embodiments, the account classification system may derive a loss value corresponding to each attribute type representing the amount of influence that attribute type has on determining the risk level of the particular user account. For example, the account classification system may derive a loss value corresponding to the credit card number attribute type, a loss value corresponding to the phone number attribute type, a loss value corresponding to the name attribute type, a loss value corresponding to the bank account number attribute type, and a loss value corresponding to the device identifier attribute type.

Different embodiments may use different techniques to determine the loss values for the different shared attribute types. In some embodiments, the account classification system may derive the loss value corresponding to each attribute type based on the weight(s) assigned to the known fraudulent user account(s) that share the attributes of the attribute type with the particular user account. Using the example given above, since the particular user account shares the credit card number attribute with both the first known fraudulent user account and the second known fraudulent user account, the account classification system may derive the loss value corresponding to the credit card attribute type based on the first weight assigned to the first known fraudulent user account and the second weight assigned to the second known fraudulent user account. In some embodiments, the loss value corresponding to an attribute type may be derived by computing a sum of the weights assigned to the known fraudulent user accounts that share the attributes of that attribute type with the particular user account. As such, the loss value derived for the credit card number attribute type may be 500.

Since the particular user account shares the phone number attribute and the name attribute with only the first known fraudulent user account, the account classification system may derive the loss values corresponding to the phone number attribute and the name attribute, respective, based solely on the weights assigned to the first known fraudulent user account (e.g., 200). Since the particular user account shares the bank account number attribute and the device identifier attribute with only the second known fraudulent user account, the account classification system may derive the loss values corresponding to the bank account number attribute and the device identifier attribute, respective, based solely on the weights assigned to the second known fraudulent user account (e.g., 300). This way, the attribute type that is shared with more known fraudulent user accounts will carry a larger weight in determining the risk level than the attribute type that is shared with less known fraudulent user accounts.

The account classification system may then use the derived values (including the derived loss values corresponding to the different shared attribute types) to determine the risk level for the particular user account. In some embodiments, the account classification system may determine the risk level for the particular user account by comparing the derived values to a set of predetermined threshold values. In one example, the account classification system may configure a machine learning model (e.g., an artificial neural network) to take the derived loss values as input values to produce an output value that indicate the risk level for the particular user account. The account classification system may train the machine learning model based on historic data regarding accounts previously created that have been determined as either fraudulent accounts or non-fraudulent accounts to determine the different threshold values corresponding to the different attribute types.

Once a risk level is determined for the particular user account, the account classification system (or another module or system) may perform an action directed at the particular user account. In some embodiments, the account classification system may reduce an access level to the electronic services offered by the service provider when the account classification system determines that the particular user account corresponds to a fraudulent account based on the risk level. In some embodiments, the account classification system may lock the particular user account.

In some embodiments, in addition to comparing attributes of the particular user account against attributes of the known fraudulent user accounts to establish links between the particular user account and two or more of the known fraudulent user accounts, the account classification system may also compare attributes among the known fraudulent user accounts to establish one or more links among the known fraudulent user accounts. The account classification system may compare attributes among all identified known fraudulent user accounts or only compare attributes among the known fraudulent user accounts that are linked to the particular user account. When it is determined that two known fraudulent user accounts (where at least one of them has existing links to the particular user account) have shared attributes (are related to each other, with a possibility that they are both created by the same malicious user), it is more likely that the particular user account is associated with one or more of the two known fraudulent user accounts than other known fraudulent user accounts. Thus, based on this determination, the account classification system may perform further analysis on the attributes between the particular user account and the two known fraudulent user accounts to establish additional connections (links) between them.

For example, by comparing the attributes of the first and second known fraudulent user accounts, the account classification system may determine that the first and second known fraudulent user accounts share the attributes of the email attribute type (e.g., the emails attributes of the first and second known fraudulent user accounts correspond to each other based on the first similarity threshold). Thus, the graph may include a link corresponding to the email attribute type between the first and second known fraudulent user accounts. Based on this link (shared attributes) between the first and second known fraudulent user accounts, the account classification system may analyze the attributes of the particular user account and the attributes of the first and second known fraudulent user accounts to determine additional shared attributes between the particular user account and each of the first and second known fraudulent user accounts. In some embodiments, the account classification system may apply a second similarity threshold different from the first similarity threshold when comparing the attributes of the particular user account and the attributes of the first and second known fraudulent user accounts. The second similarity threshold may have a lower threshold (e.g., looser, not as strict, etc.) than the first similarity threshold such that attributes that may not be determined as shared based on the first similarity threshold may now be determined as shared based on the second similarity threshold.

Using the example given above, the account classification system may compare attributes of the particular user account and attributes of each of the first and second known fraudulent user accounts to determine whether any attributes are shared based on the second similarity threshold. For example, while the attributes of the address attribute type were not determined to be shared between the particular user account and the second known fraudulent user account based on the first similarity threshold (e.g., addresses being not on the same street), the account classification system may determine that the attributes of the address attribute type are shared between the particular user account and the second known fraudulent user account based on the second similarity threshold (e.g., addresses being in the same city). Thus, the graph would include a new link between the particular user account and the second known fraudulent user account corresponding to the address attribute type. The new link (the new shared attribute) may also be used by the account classification system in deriving the loss values. For example, the account classification system may use the newly shared attribute to derive a loss value for the address attribute type. In some embodiments, the link (shared attribute) established under the second similarity threshold may have less weight than the link (shared attribute) established under the first similarity threshold. As such, the account classification system may apply a reduced weight to the shared address attribute between the particular user account and the second known fraudulent user account when deriving the loss value for the address attribute type.

Since the account classification system according to various embodiments of the disclosure analyze attributes of the particular user account with attributes of multiple known fraudulent user accounts collectively to determine the risk level for the particular user account, the account classification system may determine that the particular user account corresponds to a fraudulent user account more effectively and accurately. Furthermore, as described herein, the account classification system may advantageously detect additional connections (links, shared attributes) between the particular user account with one or more known fraudulent user account based on links that are determined among the known fraudulent user accounts, where those additional connections would not have been detected if the particular user account is analyzed against each known fraudulent user account independent.

FIG. 1 illustrates an electronic transaction system 100 within which the account classification system may be implemented according to one embodiment of the disclosure. The electronic transaction system 100 includes a service provider server 130 and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 and/or other user devices similar to the user device 110 over the network 160. For example, the user 140 may use the user device 110 to log in to a user account to access account services or conduct electronic transactions (e.g., account transfers or payments, purchase goods and/or services, sales of goods and/or services, receive payments of the sale, etc.) with the service provider server 130. As such, the user 140 may be a buyer, a seller, or both, and the user account created by the user 140 may correspond to a buyer account, a seller account, or an account that can perform services associated with both a buyer and a seller. Furthermore, the user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., selling, shopping, purchasing, bidding, etc.) with the service provider server 130 over the network 160. In one aspect, purchase expenses may be directly and/or automatically debited from the user account related to the user 140 via the user interface application 112. Similarly, sales receipts may be directly and/or automatically credited to the user account associated with the user 140.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. For example, when the user is a merchant, the other applications 116 may include a merchant database for identifying available items, which may be made available to other user devices for viewing and purchase by the corresponding users. The other applications, in one embodiment, may also include a marketplace application, which may be configured to provide information over the network 160 to the user interface application of another user device. For example, the user of another user device may interact with the marketplace application through the user interface application over the network 160 to search and view various items available for purchase in the merchant database. The other applications 116 may also include an application programming interface (API) that allows the merchant to offer sale of goods or services and allows a customer to make payment to the user account of the merchant through the service provider server 130, while the customer may have an account with the service provider server 130 that allows the customer to use the service provider server 130 for making payments to merchants that allow use of authentication, authorization, and payment services of the service provider as a payment intermediary.

In another example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. For example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The service provider server 130, in one embodiment, may be maintained by a transaction processing entity or an online service provider, which may provide processing for electronic transactions between the users of the user devices (such as the user 140 of the user device 110). As such, the service provider server 130 may include a service application 138, which may be adapted to interact with the user devices (such as the user device 110) over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

The service provider server 130 may also include an account classification module 132 that implements the account classification system according to one embodiment of the disclosure. In some embodiments, the account classification module 132 may implement the functionalities of the account classification system as disclosed herein. For example, the account classification module 132 may be configured to evaluate a particular user account registered through the service provider server 130 and determine whether the particular user account corresponds to a fraudulent account by analyzing attributes of the particular user account against attributes of multiple known fraudulent user accounts stored in the accounts database 136. The account classification module 132 may then produce an output (e.g., the risk level) associated with the particular user account to other modules in the service provider server 130 (e.g., web server 134 and/or the service application 138) such that the other module may perform the corresponding actions to the particular user account based on the determined risk level.

Figure 2:
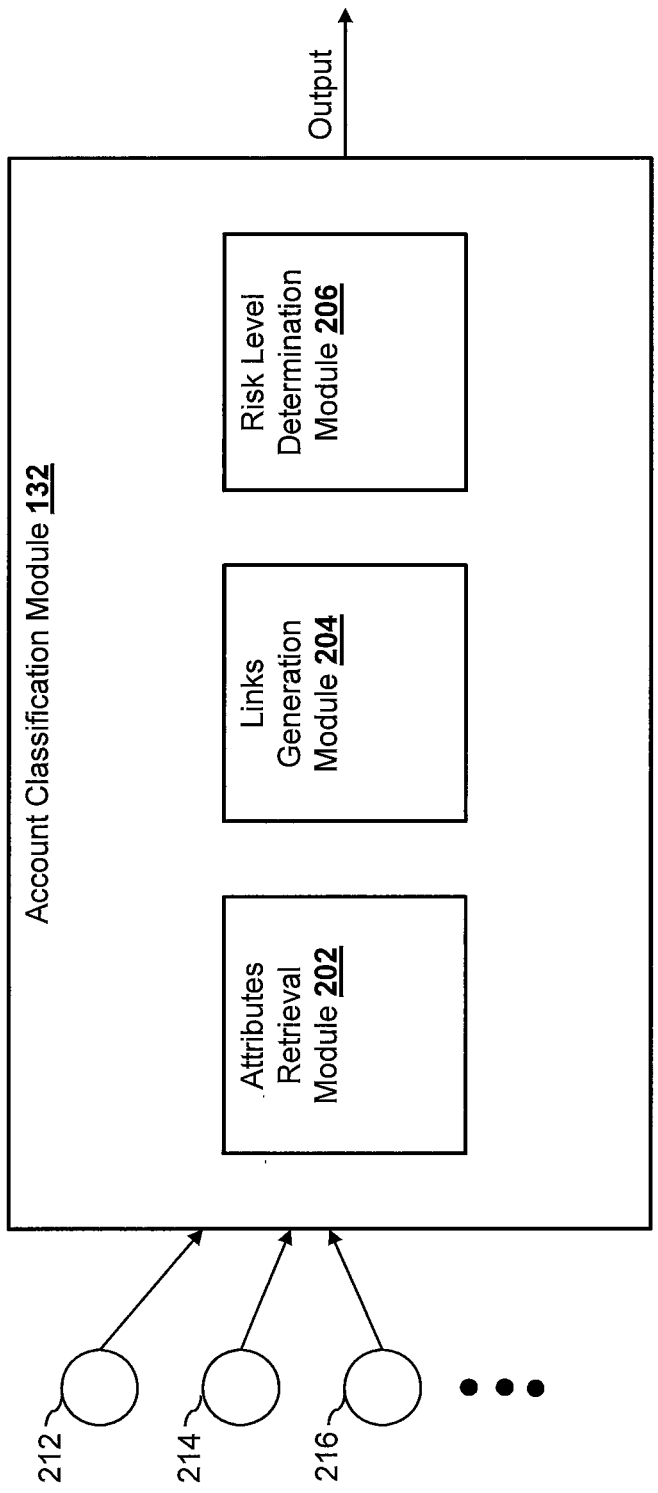
FIG. 2 is a block diagram illustrating an account classification module according to an embodiment of the present disclosure.

FIG. 2 illustrates a block diagram of the account classification module 132 according to an embodiment of the disclosure. The account classification module 132 includes an attributes retrieval module 202, a links generation module 204, and a risk level determination module 206. In some embodiments, the account classification module 132 may receive a request for evaluating a particular user account (e.g., a particular seller account). In some embodiments, the account classification module 132 may automatically evaluate a particular user account when the particular user account is created. In yet some embodiments, the account classification module 132 may perform account evaluation periodically (e.g., every month, every 6 months, etc.) to evaluate accounts that have been created in the corresponding period.

The account classification module 132 may use the attributes retrieval module 202 to retrieve attributes of the particular user account and attributes of known fraudulent user accounts registered with the service provider server 130. The links generation module 204 may analyze the retrieved attributes and determine links (shared attributes) between the particular user account and two or more of the known fraudulent user accounts. The links generation module 204 may also derive loss values based on the links. The risk level determination module 206 may then use the loss values to produce an output, such as a risk level that indicates a likelihood that the particular user account corresponds to a fraudulent user account.

Figure 3:
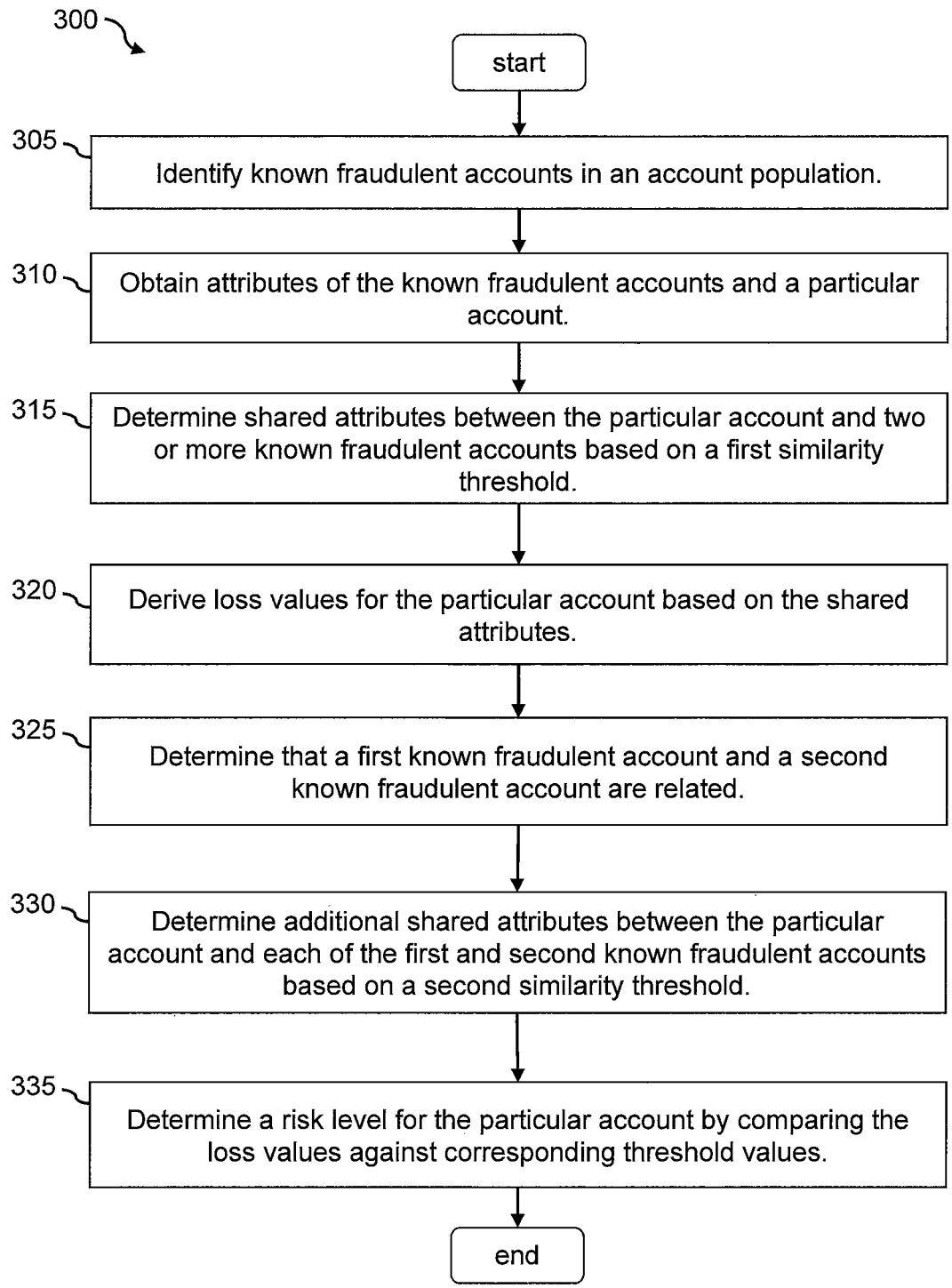
FIG. 3 is a flowchart showing a process of classifying a user account according to an embodiment of the present disclosure.

FIG. 3 illustrates a process 300 for classifying a particular user account according to various embodiments of the disclosure. In some embodiments, the process 300 may be performed by the account classification module 132. The process 300 begins by identifying (at step 305) known fraudulent accounts in an account population. For example, the account classification module 132 may determine or identify one or more user accounts from the account population as fraudulent user accounts by monitoring account activities associated with the user accounts. In one example, the account classification module 132 may obtain account activity history of the user accounts registered through the service provider server 130 from the accounts database 136. The account classification module 132 may then determine that a user account is a fraudulent user account when the account classification module 132 determines one or more losses incurred from activities performed through the user accounts. In another example, the service provider may determine that a user account is a fraudulent user account by determining that the account activities of the user account correspond to a predetermined fraudulent activity pattern (e.g., repetitively performing transactions in small amounts over a period of time, etc.). The account classification module 132 may periodically (e.g., every week, every month, etc.) assess account activity history of the registered user accounts to determine/identify fraudulent accounts.

Figure 4:
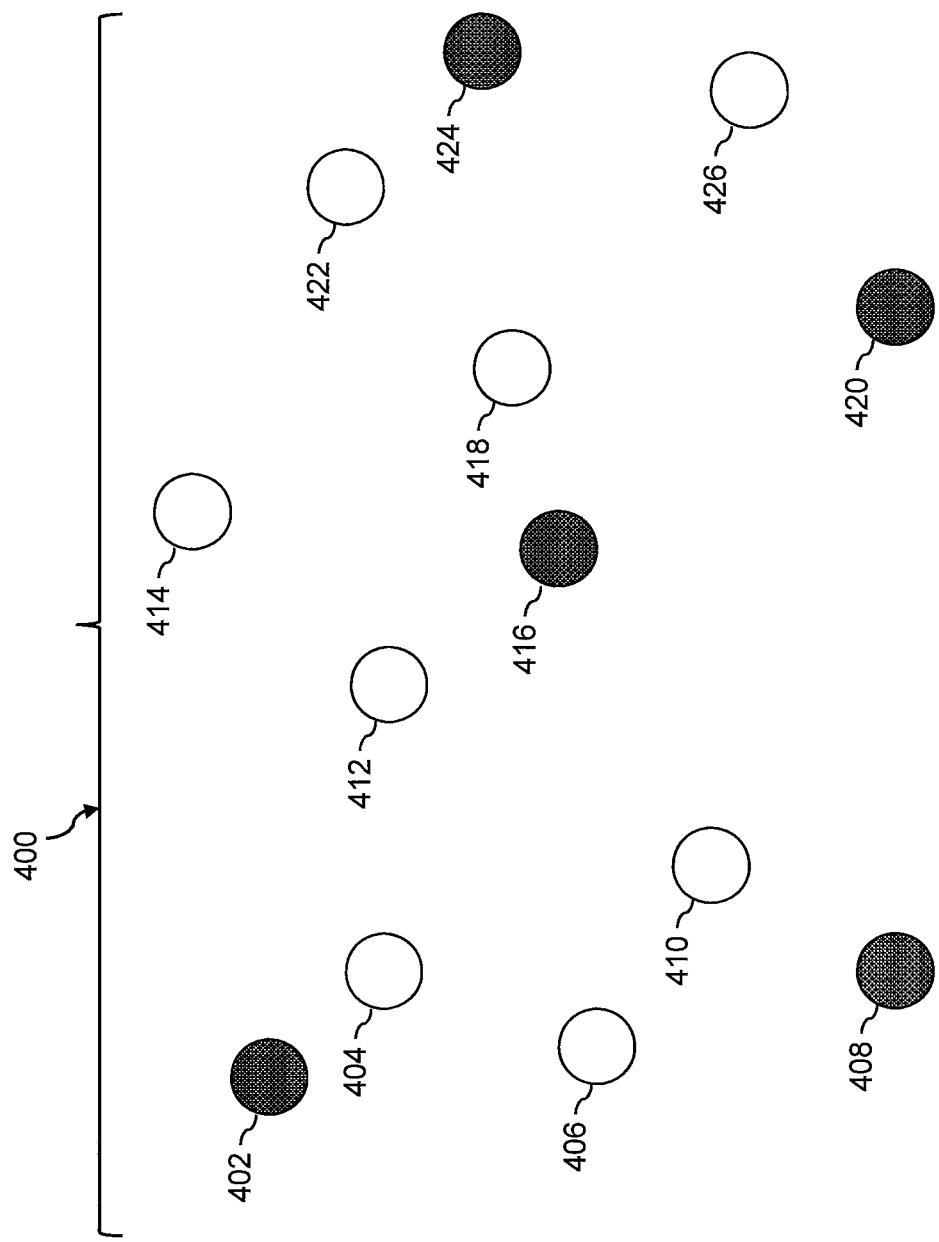
FIG. 4 illustrates an example account population according to an embodiment of the present disclosure.

FIG. 4 illustrates an example account population 400 that includes user accounts 402-426 registered through the service provider server 130. By monitoring the account activities of the user accounts 402-426, the account classification module 132 may determine/identify user accounts 402, 408, 416, 420, and 424 as known fraudulent user accounts. Upon identifying the known fraudulent user accounts 402, 408, 416, 420, and 424 from the account population 400, the account classification module 132 (or another module within the service provider server 130) may attempt to limit further losses by limiting access of the first user account (e.g., by deactivating the known fraudulent user accounts 402, 408, 416, 420, and 424). However, as mentioned above, even though the known fraudulent user accounts 402, 408, 416, 420, and 424 are deactivated, the malicious users who created the known fraudulent user accounts 402, 408, 416, 420, and 424 may create other accounts (e.g., a new user account) with the service provider server 130, and may then continue to perform the fraudulent account activities through the new user accounts until they are again detected by the account classification module 132.

As such, according to various embodiments of the disclosure, an account classification system may classify a user account as a fraudulent user account based on analyzing links established with known fraudulent user accounts collectively. This way, a new user account created by the malicious user who is associated with one or more known fraudulent accounts may be automatically detected even before the new user account is ever used to perform fraudulent activities. Thus, the account classification module 132 may be configured to analyze a particular user account in view of multiple known fraudulent user accounts (e.g., the known fraudulent user accounts 402, 408, 416, 420, and 424). The particular user account may be a new account that has been created within a predetermined period of time (e.g., within a day, within the past week, within the past month, etc.).

At step 310, the process 300 obtains attributes of the particular user account and attributes of the known fraudulent user accounts identified in the previous step 305. For example, the attributes retrieval module 202 may retrieve and/or derive attributes (such as attributes 212, 214, and 216) for the particular user account and the known fraudulent user account from the accounts database 136. As discussed above, example attribute types that are obtained for each of the particular user account and the known fraudulent user accounts may include at least one of a device identifier (e.g., a media access control (MAC) address, a serial number of a device, etc.) of a device used to access the known fraudulent account, a browser type used to access the known fraudulent account, an Internet Protocol (IP) address associated with the device used to access the known fraudulent account, a physical address, a phone number, an identifier of a funding source (e.g., a bank account number, a credit card account number, etc.), a name, an e-mail address, an item description of an item posted for sale through the known fraudulent account, an account number of an account to an affiliated service provider (e.g., an online marketplace website, etc.), a transaction history, and/or other information related to a user account. The attributes may be obtained from the accounts database 136.

The process 300 then determines (at step 315) shared attributes between the particular user account and two or more known fraudulent user accounts based on a first similarity threshold. For example, the links generation module 204 may compare each attribute of an attribute type associated with the particular user account and a corresponding attribute of the same attribute type associated with a known fraudulent user account to determine whether the attributes are shared based on the first similarity threshold. As discussed above, having a shared attribute between the particular user account and a known fraudulent user account means the two attributes (the attribute of the attribute type associated with the particular user account and the attribute of the same attribute type associated with the known fraudulent user account) correspond to each other based on the first similarity threshold. The attributes do not have to be identical to be considered shared between the accounts. Furthermore, the first similarity threshold may be defined differently for different attribute types and may depend on the type of attribute, e.g., funding account numbers and device identifiers may need exact matches, while user names, type of goods sold, and locations of accounts may allow differences up a certain threshold. For example, for the device identifier attribute type, the phone number attribute type, the name attribute type, the first similarity threshold may be defined based on a specific percentage of identical letters or numerals in the attributes. In another example, the first similarity threshold for the address attribute type may be defined by a geographical distance between the two addresses (e.g., same city, same zip code, same street, etc.). In yet another example, the first similarity threshold for the IP address may be defined by having identical sub-addresses in one or more classes (e.g., Class A, Class B, Class C, Class D, etc.) of the IP addresses. For the item description attribute type, the first similarity threshold may be defined by the type of items being sold and/or defined by a logic that determines how similar the linguistic expressions are in describing items being sold. For the number of transactions attribute type, the first similarity threshold may be defined by a threshold number of transactions between the particular user account and a known fraudulent user account. For the shared group of buyers attribute type, the first similarity threshold may be defined by the number of common buyers who have purchased from both the particular user account and the known fraudulent user account.

Figure 5:
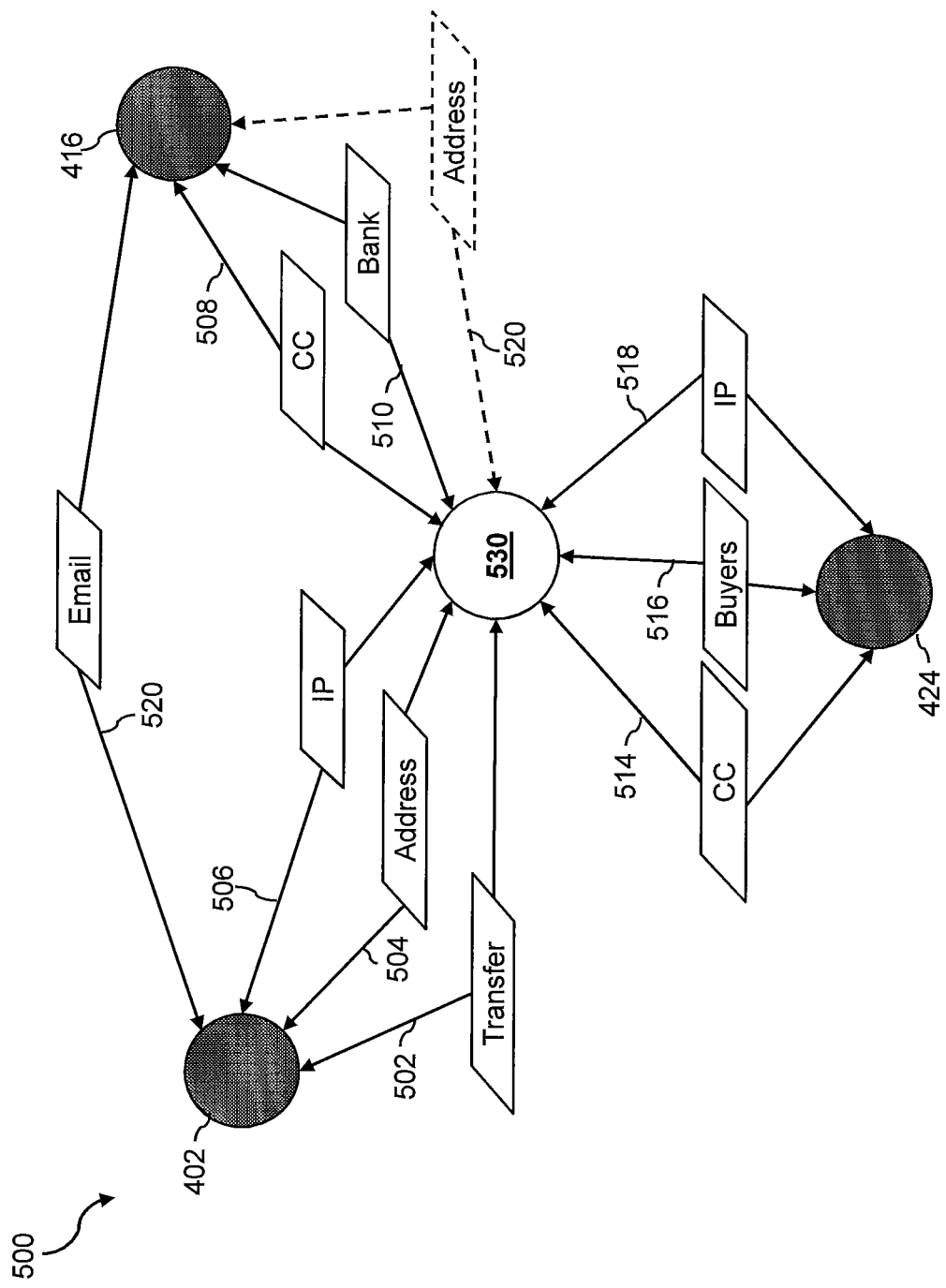
FIG. 5 is a graph illustrating links between a user account and multiple known fraudulent user accounts according to an embodiment of the present disclosure.

In some embodiments, the links generation module 204 may also generate a graph that represents the determined shared attributes between the particular user account and two or more known fraudulent user accounts. FIG. 5 illustrates an example graph 500 generated by the links generation module 204. In this example, the graph 500 is generated by the links generation module 204 during the process of classifying a user account 530. The user account 530 may be created through the service provider server 130 within a predetermined period of time (e.g., within the past month, with the past six months, etc.). The links generation module 204 generates the graph 500 for the user account 530 by comparing attributes of the user account 530 against attributes of the known fraudulent user accounts 402, 408, 416, 420, and 424. In some embodiments, the links generation module 204 generates a link for each attribute (corresponding to an attribute type) that the user account 530 shares with a known fraudulent user account. In this example, as shown in the graph 500, the links generation module 204 determines that the user account 530 is linked to three known fraudulent user accounts 402, 416, and 424. Specifically, the links generation module 204 determines that the user account 530 shares the transfer attribute (e.g., the number of electronic funds transfers between the user account 530 and the known fraudulent user account 402 exceeds the first similarity threshold), the address attribute (e.g., the addresses are located on the same street, etc.), and the IP address attribute (e.g., the IP addresses have the same Class A, Class B, and Class C sub-addresses, etc.) with the known fraudulent user account 402, as indicated by the links 502, 504, and 506, respectively. The links generation module 204 also determines that the user account 530 shares the credit card attribute (e.g., credit cards are issued by the same bank, as indicated by the card numbers, etc.) and the bank account number attribute (e.g., the accounts are from the same local branch of the bank, as indicated by the bank account number, etc.) with the known fraudulent user account 416, as indicated by the links 508 and 510, respectively. The links generation module 204 also determines that the user account 530 shares the credit card attribute, the buyer attribute, and the IP address attribute with the known fraudulent user account 424, as indicated by the links 515, 516, and 518, respectively.

Figure 6:
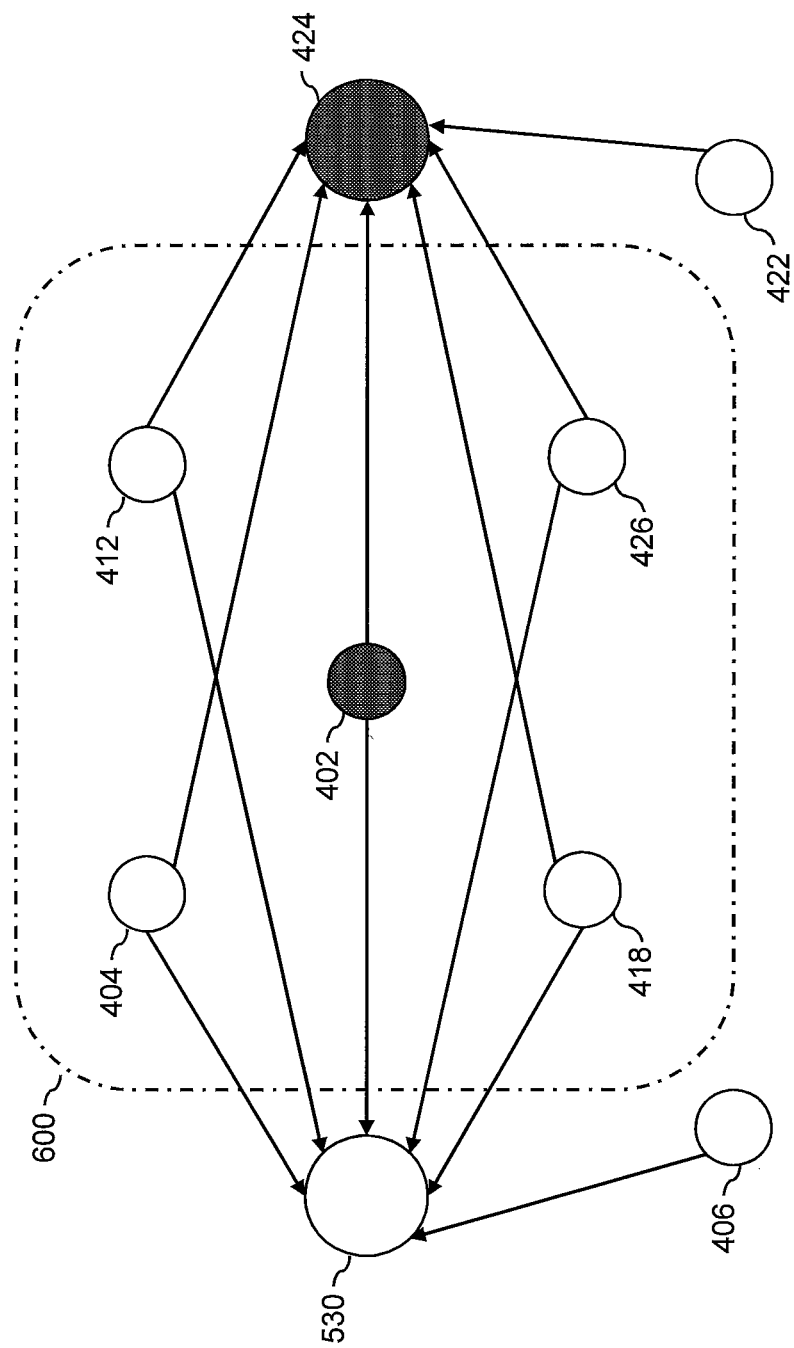
FIG. 6 illustrates a network of buyers who have purchased from a user account and a known fraudulent user account according to an embodiment of the present disclosure.

As discussed above, the buyer attribute type corresponds to the identity of one or more buyers (e.g., buy accounts)

who have purchased items from the user account. In some instances, one or more malicious users may create multiple user accounts that collude in the process of performing fraudulent account activities. For example, the one or more malicious users may use the multiple user accounts to purchase items from each other to generate positive a transaction history, trust scores, etc. for the user accounts. FIG. 6 illustrates the user accounts that have been purchased from the user account 530 and the known fraudulent user account 424. In the example illustrated in FIG. 6, the links generation module 204 may determine that the user accounts 402, 404, 406, 412, 418, and 426 have purchased from the user account 530 in the past, and the user accounts 402, 404, 412, 418, 422, and 426 have purchased from the known fraudulent user account 424 in the past. Thus, the links generation module 204 may determine that a set of common buyers 600 have purchased from both the user account 530 and the known fraudulent user account 424 in the past.

For the buyer attribute type, the first similarity threshold may be defined by a predetermined number of common buyers (e.g., 4) who have purchased from the user accounts. Thus, based on the first similarity threshold, the links generation module 204 may determine that the user account 530 shares the buyer attribute with the known fraudulent user account 424 since the set of common buyers 600 comprises more than 4 buyers. Furthermore, in some embodiments, the first similarity threshold may narrow the criteria by restricting a time period (e.g., within the past year, within the past 2 years, etc.) within which the set of common buyers have purchased from the corresponding use accounts.

The account classification module 132 may then derive values from information represented by the graph 500 and use the derived values to determine a risk level indicating a likelihood that the particular user account corresponds to a fraudulent account. As such, the process 300 derives (at step 320) loss values for the user account based on the shared attributes. For example, based on the graph 500, the account classification module 132 may derive a value based on the number of known fraudulent user accounts that are linked to the user account 530, a value based on the total loss incurred through activities from the known fraudulent user accounts that are linked to the user account 530, a value based on the total number of links generated for the user account 530 (the number of shared attributes with the linked known fraudulent user accounts), and other values. These values provide the account classification module 132 insights to the relationship of the user account 530 with multiple known fraudulent user accounts (e.g., the known fraudulent user accounts 402, 416, and 424) that would not have been available if the user account 530 is analyzed against each known fraudulent user account independently.

In some embodiments, the account classification module 132 may determine a total loss value (by the service provider associated with the service provider server 130 or users associated with the user accounts of the service provider server 130) incurred from activities of each of the known fraudulent user accounts 402, 416, and 424. In this example, the account classification module 132 may determine that a loss of $200 has been incurred from activities through the known fraudulent user account 402, a loss of $300 has been incurred from activities through the known fraudulent user account 416, and a loss of $100 has been incurred from activities through the known fraudulent user account 424. As such, the account classification module 132 may derive that the total loss incurred from activities through the known fraudulent user accounts 402, 416, and 424 is $600.

In some embodiments, the links generation module 204 may assign weights to each of the known fraudulent user accounts 402, 416, and 424 such that the account classification module 132 may compute a weighted number of links value based on different known fraudulent user accounts linked to the user account 530. For example, the account classification system may determine the weights assigned to the different known fraudulent user accounts based on the monetary loss amounts incurred by activities through the corresponding known fraudulent user accounts, such that the known fraudulent user account 402 has a weight of 200, the known fraudulent user account has a weight of 300, and the known fraudulent user account 424 has a weight of 100. Thus, based on the weight assigned to the known fraudulent user account 402, each of the links 502, 504, and 506 has a value of 200. Based on the weight assigned to the known fraudulent user account 416, each of the links 508 and 510 has a value of 300. Similarly, based on the weight assigned to the known fraudulent user account 424, each of the links 514, 516, and 518 has a value of 100. The account classification module 132 may then derive a total link value of 1500 for the user account 530.

In addition to assigning different weights (which represent an amount of influence to the risk level of the particular user account) to different known fraudulent user accounts linked to the user account 530, the links generation module 204 may determine the influence of each shared attribute type in determining the risk level. For example, an attribute type that the user account 530 shares with multiple known fraudulent user accounts (through multiple links associated with the attribute type with the known fraudulent user accounts) should have a greater impact in determining that the user account 530 corresponds to a fraudulent account than an attribute type that the user account 530 shares with only one known fraudulent user account. As such, in some embodiments, the links generation module 204 may derive a loss value corresponding to each attribute type representing the amount of influence that attribute type has on determining the risk level of the user account 530. Thus, the links generation module 204 may derive a links value (also known as a loss value) corresponding to each attribute type that the user account 530 shares with a known fraudulent user account based on the graph 500. For example, since the links 502, 504, 506, 508, 510, 514, 516, and 518 correspond to the set of attribute types including the number of transfers attribute type, the address type, the IP address type, the credit card number type, the bank account number type, and the number of common buyers type, the links generation module 204 may generate a loss value corresponding to the number of transfers attribute type, a loss value corresponding to the address type, a loss value corresponding to the IP address type, a loss value corresponding to the credit card number type, a loss value corresponding to the bank account number type, and a loss value corresponding to the number of common buyers type.

Different embodiments may use different techniques to determine the loss values for the different shared attribute types. In some embodiments, the loss value corresponding to a particular attribute type can be computed based on the link values of the links corresponding to the particular attribute type. For example, since there is only one link (the link 502) corresponding to the number of transfers attribute type, the loss value derived for the number of transfers attribute type may be 200 (the link value associated with the link 502). The links generation module 204 may determine that since there is only one link (the link 504) corresponding to the address attribute type, the links generation module 204 may derive a value of 200 (the link value associated with the link 504) for the loss value corresponding to the address attribute type. The links generation module 204 may determine that since there are two links (the links 506 and 518) corresponding to the IP address attribute type, the links generation module 204 may derive a value of 300 (the sum of the link value associated with the link 506 and the link value associated with the link 518) for the loss value corresponding to the IP address attribute type.

The links generation module 204 may determine that since there are two links (the links 508 and 514) corresponding to the credit card number attribute type, the links generation module 204 may derive a value of 400 (the sum of the link value associated with the link 508 and the link value associated with the link 514) for the loss value corresponding to the credit card number attribute type. The links generation module 204 may determine that since there is only one link (the link 510) corresponding to the bank account number attribute type, the links generation module 204 may derive a value of 300 (the link value associated with the link 510) for the loss value corresponding to the bank account number attribute type. Lastly, the links generation module 204 may determine that since there is only one link (the link 516) corresponding to the number of common buyers attribute type, the links generation module 204 may derive a value of 100 (the link value associated with the link 516) for the loss value corresponding to the number of common buyers attribute type.

In some embodiments, when a first known fraudulent user account that is linked to the user account 530 is determined to be related to a second known fraudulent user account, the likelihood that the user account 530 is also linked to (or have more number of links with) the first and second known fraudulent user account increases. As such, in addition to comparing attributes of the user account 530 against attributes of the known fraudulent user accounts to establish links between the user account and the known fraudulent user accounts 402, 416, and 424, the links generation module 204 of some embodiments may also compare attributes among the known fraudulent user accounts to establish one or more links among the known fraudulent user accounts. For example, the links generation module 204 may compare attributes among all identified known fraudulent user accounts, only compare attributes among the known fraudulent user accounts that are linked to the particular user account, or compare attributes of every two known fraudulent user accounts where at least one of the two known fraudulent user accounts is linked to the user account 530. When it is determined that two known fraudulent user accounts (where at least one of them has existing links to the particular user account) have shared attributes (are related to each other, with a possibility that they are both created by the same malicious user), the links generation module 204 may determine it is more likely that the particular user account is associated with one or more of the two known fraudulent user accounts than other known fraudulent user accounts. Thus, based on this determination, the links generation module 204 may perform further analysis on the attributes between the particular user account and the two known fraudulent user accounts to establish additional connections (links) between them.

Referring back to FIG. 3, the process 300 determines (at step 325) that a first known fraudulent account and a second known fraudulent account are related. For example, the links generation module 204 may compare the attributes among the known fraudulent user accounts 402, 416, and 424, and may determine that the known fraudulent user account 402 shares the email attribute with the known fraudulent user account 416 based on the first similarity threshold. Thus, the links generation module 204 establishes a link 520 to represent the shared email attribute between the known fraudulent user accounts 402 and 416.

In some embodiments, based on this link (relationship) between the known fraudulent user accounts 402 and 416, the links generation module 204 may analyze the attributes of the user account 530 and the attributes of the known fraudulent user accounts 402 and 416 more closely to determine additional shared attributes (links) between the user account 530 and each of the known fraudulent user accounts 402 and 416. In some embodiments, also based on the established link (relationship) between the known fraudulent user accounts 402 and 416, the links generation module 204 may apply a second similarity threshold different from the first similarity threshold when comparing the attributes of the user account 530 and the attributes of the known fraudulent user accounts 402 and 416. The second similarity threshold may have a lower threshold (e.g., looser, not as strict, etc.) than the first similarity threshold such that attributes that may not be determined as shared based on the first similarity threshold may now be determined as shared based on the second similarity threshold. Thus, in step 330, the process 300 determines additional shared attributes (links) between the user account and each of the first and second known fraudulent accounts based on a second similarity threshold.

In this example, the links generation module 204 may compare attributes of the user account 530 and attributes of each of the known fraudulent user accounts 402 and 416 to determine whether any attributes are shared based on the second similarity threshold. In some embodiments, the links generation module 204 may selectively compare attributes of one or more particular attribute types for this comparison. For example, for the known fraudulent user account 416, the links generation module 204 may select attribute types (e.g., the credit card number attribute type and the bank account attribute type) that are excluded from the existing links (e.g., the links 508 and 510). In some embodiments, the links generation module 204 may select attribute types that are both excluded from the existing links with the fraudulent user account 416, but included in the existing links with the fraudulent user account 402 (e.g., the number of transfer attribute type, the physical address attribute type, and the IP address attribute type).

In this example, the links generation module 204 may determine that while the attributes of the address attribute type were not shared between the user account 530 and the known fraudulent user account 416 based on the first similarity threshold (e.g., addresses being not on the same street), the links generation module 204 may determine that the attributes of the address attribute type are shared between the user account 530 and the known fraudulent user account 416 based on the second similarity threshold (e.g., addresses being in the same city). Thus, the links generation module 204 may add a new link 520 to the graph 500 indicating the shared address attribute between the user account 530 and the known fraudulent user account 416.

In the example given above, the links generation module 204 established a link (a relationship) between two known fraudulent user accounts 402 and 416 that have already been linked to the user account 530. As discussed above, the links generation module 204 may compare attributes of known fraudulent user accounts that are not already linked to the user account 530. Thus, one or both of the known fraudulent user accounts that are determined to be related (linked) with each other may not already be linked to the user account 530. For example, based on the comparison, the links generation module 204 may determine that the known fraudulent user account 424 (already linked to the user account 530) shares an attribute with a known fraudulent user account 420 (not yet linked to the user account 530) based on the first similarity threshold. The links generation module 204 may then determine that the user account 530 shares an attribute with the known fraudulent user account 420 based on the second similarity threshold, and thus establish a new link between the user account 530 and the known fraudulent user account 420 based on the shared attribute. As such, not only may new link(s) with already linked known fraudulent user account(s) be formed in this step, new known fraudulent user account(s) may also be linked to the user account 530 during this step.

In some embodiments, the links generation module 204 may update the derived loss values based on the new shared attributes (the new links). However, since the new attributes (new links) were determined based on the second similarity threshold (that is a lower threshold than the first similarity threshold), the links generation module 204 may determine that the new link 520 is not as strong as the other links (e.g., the links 502-518) that were generated based on the first similarity threshold. Thus, the links generation module 204 of some embodiments may apply a reduced weight (e.g., 0.8, 0.6, etc.) to the links that are generated based on the second similarity threshold when updating the loss values. For example, the link value of the link 520 may be a portion of the total loss incurred from activities through the known fraudulent user account 416. In one example, the link value of the link 520 may be 180 (300×0.6).

As such, the links generation module 204 may update the total link value by incorporating the reduced link value (180) associated with the new link 520 to generate an updated total link value of 1680. Furthermore, the links generation module 204 may also update the loss value corresponding to the address attribute type by incorporating the reduced link value (180) associated with the link 520. Since there are now two links (link 504 and 520) corresponding to the address attribute type, the links generation module 204 may derive an updated value of 380 (the link value associated with the link 504 and the reduced link value associated with the link 520) for the loss value corresponding to the address attribute type.

If a new known fraudulent user account is linked to the user account 530 in the step 330, the links generation module 204 may also update other values, such as the value corresponding to the number of known fraudulent user accounts linked to the user account 530.

The process 300 then determines (at step 335) a risk level for the user account by comparing the derived values against corresponding threshold values. For example, the risk level determination module 206 may determine the risk level for the user account 530 by comparing one or more of the derived values, such as the value corresponding to the total number of known fraudulent user accounts linked to the user account 530 (e.g., 3), the value corresponding to the total loss incurred through activities from the known fraudulent user accounts that are linked to the user account 530 (e.g., 600), the value corresponding to the total number of links generated for the user account 530 (e.g., 9), the total loss value (e.g., 1680), and the various loss values corresponding to the different attribute types against their corresponding threshold values. The risk level may indicate the likelihood that the user account 530 corresponds to a fraudulent account.

In some embodiments, the account classification module 132 may determine the threshold values based on empirical data. For example, the account classification module 132 may use historical account data associated with known fraudulent user account and non-fraudulent account to determine the threshold values. In some embodiments, the risk level determination module 206 may include, or utilize, a machine learning model to determine the risk level for the user account 530. The machine learning module may be implemented as an artificial neural network. The risk level determination module 206 may configure the machine learning model to take the one or more of the derived values as input values in the model, and configure the machine learning model to produce an output value corresponding to the risk level of the user account 530. The risk level determination module 206 may also train the machine learning model using the historic account data associated with known fraudulent user account and non-fraudulent account such that the machine learning model may be trained by continuously adjusting the various threshold values corresponding to the derived values (the input values to the machine learning model) to produce the output value.

Once the account classification module 132 determines the risk level for the user account 530, the account classification module 132 may perform an action on the user account 530 based on the determined risk level. For example, when the account classification module 132 determines that the risk level is above a first risk threshold, the account classification module 132 may limit the user account 530 access to certain services provided by the service provider server 130. For example, the account classification module 132 may limit the user account 530 by allowing the user account 530 to perform transactions under a certain predetermined amount, to perform only a predetermined number of transactions within a period (e.g., 5 transactions a month), or both. In another example, when the account classification module 132 determines that the risk level is above a second risk threshold, the account classification module 132 may deactivate the user account 530.

As disclosed herein, the account classification system according to various embodiments of the disclosure classifies a user account based on the user account's collective links or shared attributes to two or more known fraudulent user accounts. By analyzing the user account's collective links to two or more known fraudulent user accounts, the account classification system may advantageously determine additional relationship (links) with the two or more known fraudulent user accounts that may not have been discovered when the user account is analyzed against each individual known fraudulent user account independent. Furthermore, by analyzing the links between the user account and the two or more known fraudulent user accounts, the account classification system may advantageously determine that the user account corresponds to a fraudulent account even before any fraudulent activities are performed (and possible losses are incurred from the fraudulent activities) through the user account.

Figure 7:
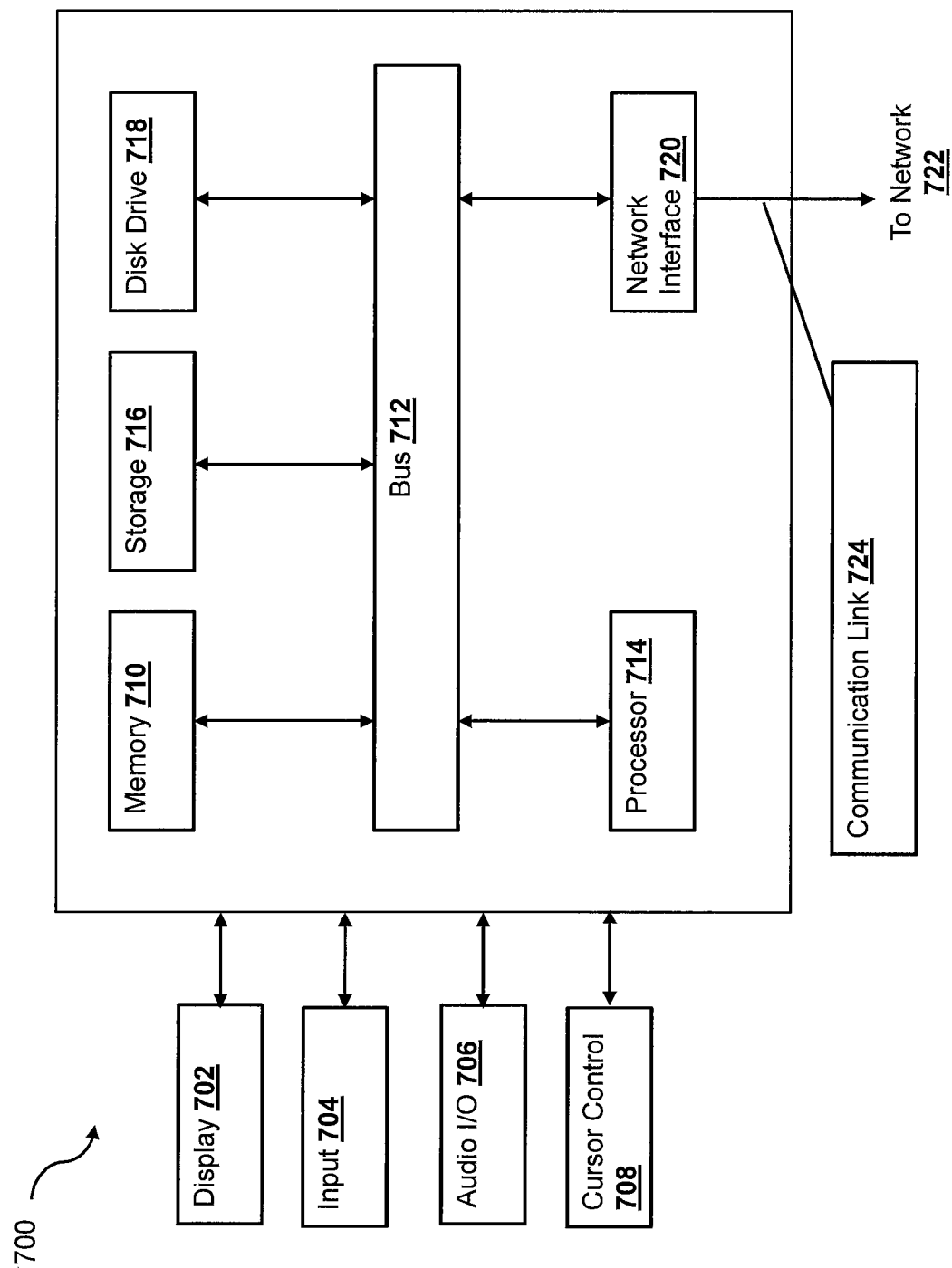
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130 and the user device 110. In various implementations, the user device 110 may include a mobile cellular phone, personal computer (PC), laptop, wearable computing device, etc. adapted for wireless communication, and the service provider server 130 may include a network computing device, such as a server. Thus, it should be appreciated that the devices 110 and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account, or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the risk analysis functionalities described herein according to the process 300.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a processor; and
   a non-transitory computer-readable storage medium having stored thereon instructions that are executable to cause the system to perform operations comprising:
   identifying, from a plurality of electronic accounts with an electronic transaction service provider, first and second electronic accounts classified as having a first specific account classification of a plurality of account classifications, wherein each of a plurality of computer devices, having a processor and a memory, is configured to perform electronic transactions through a corresponding electronic account from the plurality of electronic accounts with one or more other electronic accounts from the plurality of electronic accounts, and wherein performing an electronic transaction between two electronic accounts from the plurality of electronic accounts requires an authentication step for at least one of the two electronic accounts;

determining that a third electronic account with the electronic transaction service provider is linked to the first and second electronic accounts classified as having the first specific account classification, based on determining (i) that a first set of attributes corresponding to a first set of attribute types and associated with the third electronic account is shared with the first electronic account and (ii) that a second set of attributes corresponding to a second set of attribute types and associated with the third electronic account is shared with the second electronic account;

identifying one or more common attribute types that are included in both of the first set of attribute types and the second set of attribute types;

determining respective loss values corresponding to the one or more common attribute types; and determining a risk level associated with the third electronic account using a machine learning model configured to output the risk level associated with the third electronic account using the respective loss values corresponding to the one or more common attribute types as input values, wherein the machine learning model is trained using historic data associated with the plurality of electronic accounts that were previously created and that have been classified as either the first specific account classification or a second specific account classification of the plurality of account classifications, and wherein the risk level indicates a likelihood that the third electronic account corresponds to the first specific account classification.

2. The system of claim 1, wherein the first set of attribute types comprises at least one of a user device identifier, a browser type, an Internet Protocol address, a physical address, a phone number, an e-mail address, or a sold item description.

3. The system of claim 1, wherein the respective loss values are determined based on a first loss amount associated with the first electronic account and a second loss amount associated with the second electronic account.

4. The system of claim 1, wherein the operations further comprise:
determining that the first electronic account and the second electronic account are linked based on a shared attribute between the first electronic account and the second electronic account.

5. The system of claim 1, wherein the determining the respective loss values comprises determining a first loss value corresponding to a first attribute type of the first set of attribute types.

6. The system of claim 1, wherein the operations further comprise:
based on the determined risk level associated with the third account, performing a remedial action against the third electronic account.

7. The system of claim 6, wherein the remedial action includes restricting access to one or more services provided via the electronic transaction service provider.

8. A method, comprising:
accessing, by a computer system, account information for first and second electronic accounts of a plurality of electronic accounts with an electronic transaction service provider, wherein the first and second electronic accounts are classified as having a first specific account classification of a plurality of account classifications, wherein each of a plurality of computer devices, having a processor and a memory, is configured to perform electronic transactions through a corresponding electronic account from the plurality of electronic accounts with one or more other electronic accounts from the plurality of electronic accounts, and wherein performing an electronic transaction between two electronic accounts from the plurality of electronic accounts requires an authentication step for at least one of the two electronic accounts;

determining, by the computer system and based on the account information, that a third electronic account with the electronic transaction service provider is linked to the first and second electronic accounts classified as having the first specific account classification, based on determining (i) that a first set of attributes corresponding to a first set of attribute types and associated with the third electronic account is shared with the first electronic account and (ii) that a second set of attributes corresponding to a second set of attribute types and associated with the third account is shared with the second electronic account;

identifying, by the computer system, one or more common attribute types that are included in both of the first set of attribute types and the second set of attribute types;

determining, by the computer system, respective loss values corresponding to the one or more common attribute types; and determining, by the computer system, a risk level associated with the third electronic account using a machine learning model configured to output the risk level associated with the third electronic account using the respective loss values corresponding to the one or more common attribute types as input values, wherein the machine learning model is trained using historic data associated with the plurality of electronic accounts that were previously created and that have been classified as either the first specific account classification or a second specific account classification of the plurality of account classifications, and wherein the risk level indicates a likelihood that the third electronic account corresponds to the first specific account classification.

9. The method of claim 8, wherein the determining that the third electronic account is linked to the first and second electronic accounts is further based on attribute threshold values, wherein the attribute threshold values are determined based on historical account data associated with (i) first electronic accounts classified as the first specific classification and (ii) second electronic accounts having a classification from the plurality of account classifications different than the first specific classification.

10. The method of claim 8, further comprising:
comparing a first attribute value associated with the third electronic account to first attribute values associated with the first and second electronic accounts; and
comparing a second attribute value associated with the third electronic account to second attribute values associated with the first and second electronic accounts.

11. The method of claim 8, wherein the first set of attribute types comprises at least one of a user device identifier, a browser type, an Internet Protocol address, a physical address, a phone number, an e-mail address, or a sold item description.

12. The method of claim 8, wherein the respective loss values are determined based on a first loss amount associated with the first electronic account and a second loss amount associated with the second electronic account.

13. The method of claim 8, wherein the determining the respective loss values comprises determining a first loss value corresponding to a first attribute type of the first set of attribute types.

14. The method of claim 8, further comprising:
based on the determined risk level associated with the third account, performing a remedial action against the third electronic account.

15. A non-transitory computer-readable medium having instructions stored thereon that are executable by a computer system to cause the computer system to perform operations comprising:
accessing account information associated with first and second electronic accounts of a plurality of electronic accounts with an electronic transaction service provider, wherein the first and second electronic accounts are classified as having a first specific account classification of a plurality of account classifications, wherein each of a plurality of computer devices, having a processor and a memory, is configured to perform electronic transactions through a corresponding electronic account from the plurality of electronic accounts with one or more other electronic accounts from the plurality of electronic accounts, and wherein performing an electronic transaction between two electronic accounts from the plurality of electronic accounts requires an authentication step for at least one of the two electronic accounts;
determining, based on the account information, that a third electronic account with the electronic transaction service provider is linked to the first and second electronic accounts classified as having the first specific account classification, based on determining (i) that a first set of attributes corresponding to a first set of attribute types and associated with the third electronic account is shared with the first electronic account, and (ii) that a second set of attributes corresponding to a second set of attribute types and associated with the third electronic account is shared with the second electronic account;
identifying one or more common attribute types that are included in both of the first set of attribute types and the second set of attribute types;
determining respective loss values corresponding to the one or more common attribute types; and
determining, a risk level associated with the third electronic account using a machine learning model configured to output the risk level associated with the third electronic account using the respective loss values corresponding to the one or more common attribute types as input values, wherein the machine learning model is trained using historic data associated with the plurality of electronic accounts that were previously created and that have been classified as either the first specific account classification or a second specific account classification of the plurality of account classifications, and wherein the risk level indicates a likelihood that the third electronic account corresponds to the first specific account classification.

16. The non-transitory computer-readable medium of claim 15, wherein the operations further comprise:
denying an electronic transaction request sent to the electronic transaction service provider for the third electronic account based on the determined risk level associated with the third electronic account.

17. The non-transitory computer-readable medium of claim 15, wherein the operations further comprise:
comparing a first attribute value associated with the third electronic account to first attribute values associated with the first and second electronic accounts; and
comparing a second attribute value associated with the third account to second attribute values associated with the first and second electronic accounts.

18. The non-transitory computer-readable medium of claim 15, wherein the first set of attribute types comprises at least one of a user device identifier, a browser type, an Internet Protocol address, a physical address, a phone number, an e-mail address, or a sold item description.

19. The non-transitory computer-readable medium of claim 15, wherein the respective loss values are determined based on a first loss amount associated with the first electronic account and a second loss amount associated with the second electronic account.

20. The non-transitory computer-readable medium of claim 15, wherein the operations further comprise:
based on the determined risk level associated with the third electronic account, performing a remedial action that includes locking the third electronic account.

* * * * *